(12) United States Patent
Kaufman

(10) Patent No.: US 6,279,956 B1
(45) Date of Patent: Aug. 28, 2001

(54) MONEY SAVING BOOK

(76) Inventor: Shari Kaufman, 317 Greens Farms Rd., Westport, CT (US) 06880

( * ) Notice: Subject to any disclaimer, the term of this patent is extended or adjusted under 35 U.S.C. 154(b) by 0 days.

(21) Appl. No.: 09/259,723

(22) Filed: Mar. 1, 1999

(51) Int. Cl.⁷ ...................................................... B42D 3/00
(52) U.S. Cl. .................................. 281/31; 281/38; 281/29; 281/51; 206/8; 206/815
(58) Field of Search .................................. 281/31, 29, 22, 281/38, 51; 283/63.1, 64, 50, 117; 206/8, 815, 84

(56) References Cited

U.S. PATENT DOCUMENTS 5,988,366 * 11/1999 Krull et al. ............................. 206/8

* cited by examiner

Primary Examiner—Willmon Fridie, Jr.
(74) Attorney, Agent, or Firm—Hedman & Costigan P.C.

(57) ABSTRACT

A savings book for encouraging the saving of money by your children having a plurality of pages having slots to hold coins on both sides of the pages is disclosed.

9 Claims, 6 Drawing Sheets

MONEY SAVING BOOK

CROSS REFERENCE TO RELATED APPLICATIONS

The present application is related to U.S. patent application Ser. No. 08/730,880, now abandoned.

FIELD OF THE INVENTION

The present invention relates to a book which has change saving compartments on both sides of the pages of the book.

BACKGROUND OF THE INVENTION

The saving of and learning about money can be both a fun and an educational experience for children. By saving money, children can learn value. If the act of savings can be made fun as well, there will a greater encouragement for children to save money and the teaching experience will be greatly enhanced. In years past, piggy banks and the like have served to fulfill these goals.

By providing a book with various illustrations which are appealing to children and which also provides slots for the saving of coins on both sides of the page, the present inventor has provided a savings book in which the coin saving slots can be arranged in various forms for adaptation to illustrations. By placing the coin saving slots on both sides of the page, the book can tell a story or in some other way coordinate the illustrations. In this way, the fun of reading and looking at books can greatly enhance the enthusiasm a child will have for saving money and learning its value.

Special mention is made here of prior art saving devices in which the coin saving slots were located on a single side of a piece of cardboard, but did not teach or suggest a means for having the coin saving slots on both sides of a page or in the context of a book. Placing the coin saving slots on both sides of the pages of a book provides many significant advantages, some of which are described hereinabove.

SUMMARY OF THE PRESENT INVENTION

It is an object of the present invention to provide a compact means for assisting a child to learn the value of coins.

It is a further object of the present invention to provide a book like device which can facilitate the savings of money through such devices as illustrations and story lines.

It is still further object of the present invention to provide a savings book which will encourage children to save money by making the savings process a fun one.

Accordingly, the savings book of the present invention is comprised of a front cover, a back cover and a plurality of pages bound on one side to said covers, wherein each said pages comprises: (a) a top layer having a plurality of semicircular shapes die cut having a radius sufficiently large enough to accommodate a coin comprised of a material sufficiently strong to support a coin without tearing; (b) a second layer underneath said top layer having a plurality of circular shapes die cut therein positioned to coordinate with the semicircular shapes die cut in said top layer and comprised of a material more dense than the material employed in said top layer; (c) a middle layer underneath said second layer and comprised of a material more dense that the material employed in said top layer; (d) a fourth layer underneath said middle layer having a plurality of circular shapes die cut therein and comprised of a material more dense than the material employed in said top layer; and (e) a bottom layer having a plurality of semicircular shapes die cut therein comprised of a material sufficiently strong to support a coin without tearing, and wherein said semicircular shapes a positioned to coordinate with the semicircular shapes die cut in said top layer and comprised of a material more dense than the material employed in said top layer.

DETAILED DESCRIPTION OF THE PRESENT INVENTION AND DESCRIPTION OF THE PREFERRED EMBODIMENTS

The present invention provides a book for the saving of coins comprising a front cover, a back cover and a plurality of pages bound on one side to said covers, wherein each said pages comprises: (a) a top layer having a plurality of semicircular shapes die cut having a radius sufficiently large enough to accommodate a coin comprised of a material sufficiently strong to support a coin without tearing; (b) a second layer underneath said top layer having a plurality of circular shapes die cut therein positioned to coordinate with the semicircular shapes die cut in said top layer and comprised of a material more dense than the material employed in said top layer; (c) a middle layer underneath said second layer and comprised of a material more dense that the material employed in said top layer; (d) a fourth layer underneath said middle layer having a plurality of circular shapes die cut therein and comprised of a material more dense than the material employed in said top layer; and (e) a bottom layer having a plurality of semicircular shapes die cut therein comprised of a material sufficiently strong to support a coin without tearing, and wherein said semicircular shapes a positioned to coordinate with the semicircular shapes die cut in said top layer and comprised of a material more dense than the material employed in said top layer.

Figure 1:
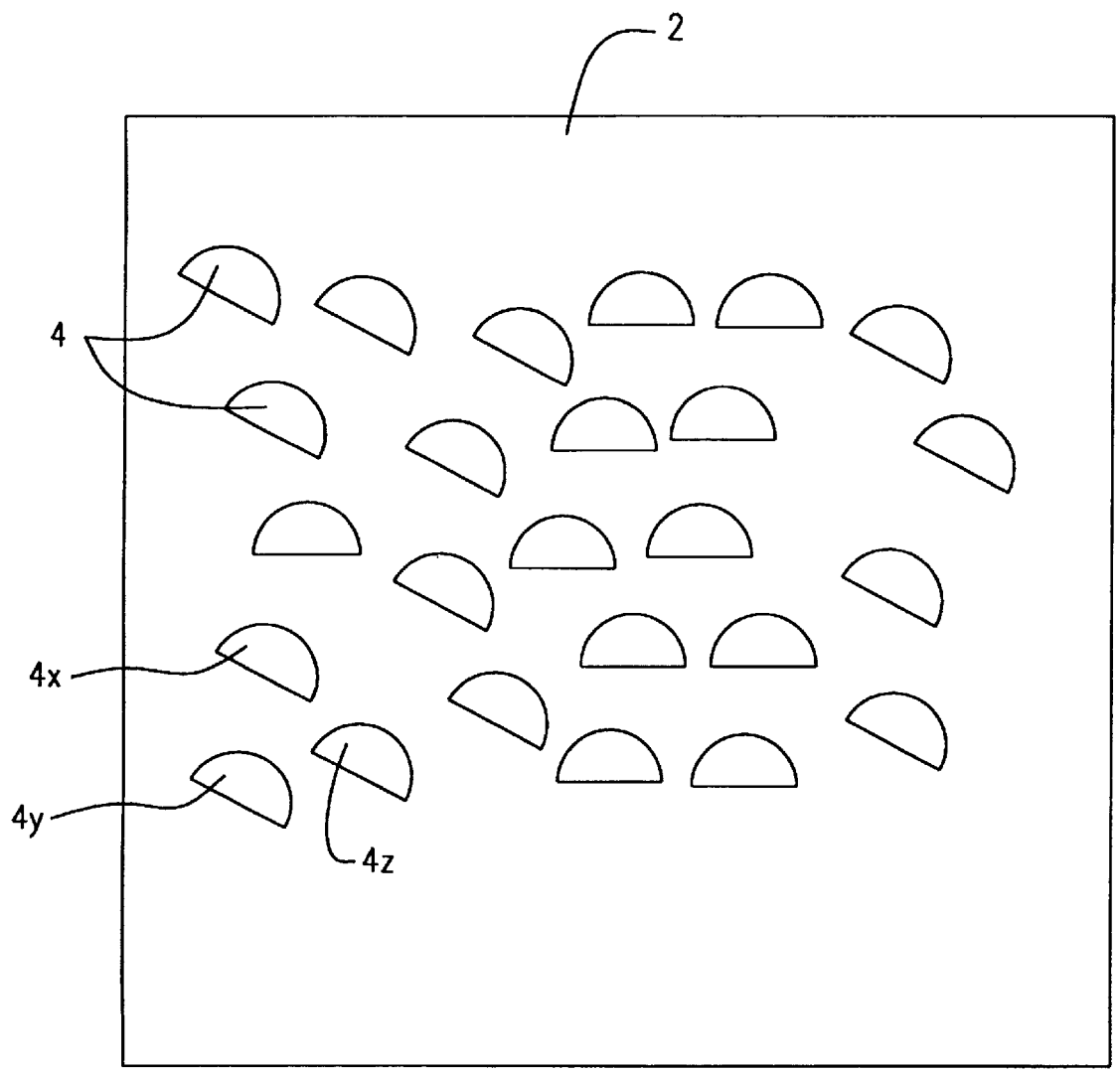
FIG. 1 is a top view of the top layer of a page of the book of the present invention.
Figure 6:
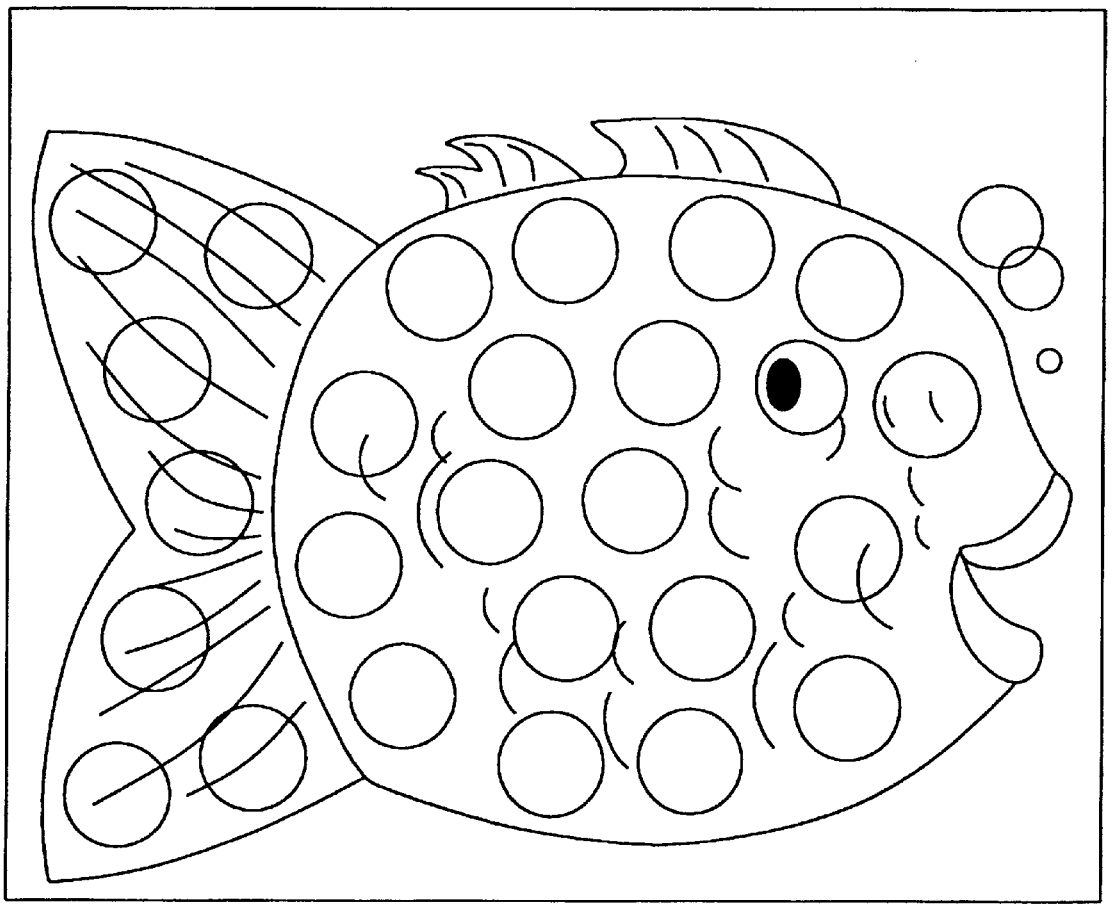
FIG. 6 depicts a top view of the a printed version wherein the slots are configured in a fish illustration.

As shown in FIG. 1, the top layer 2 is provided with a plurality of semicircular shapes die cut 4 therein. The semicircular shapes 4 may be configured into an illustration of any sort. In the embodiment of FIG. 1, they are configured into the shape of a fish (see FIG. 6).

The top layer 2 may constructed of any material which has sufficient strength so as not to rip upon the insertion of a coin into the semicircular shapes 4. Suitable for use with the present invention are plastics, cloth and paper having a density of at least about 25 g/m$^2$, more preferably about 28 g/m$^2$. The semicircular shapes 4 are sized to snugly fit pennies, nickels, dimes, quarters, half dollars, foreign coins, or combinations thereof. The invention further contemplates that spaces sized to fit dollar bills or other paper money may be employed in the practice of the present invention.

The top layer 2 is fastened to the second layer 6 (see FIG. 2) by any means known to those of ordinary skill in the art, most typically by an adhesive.

Figure 2:
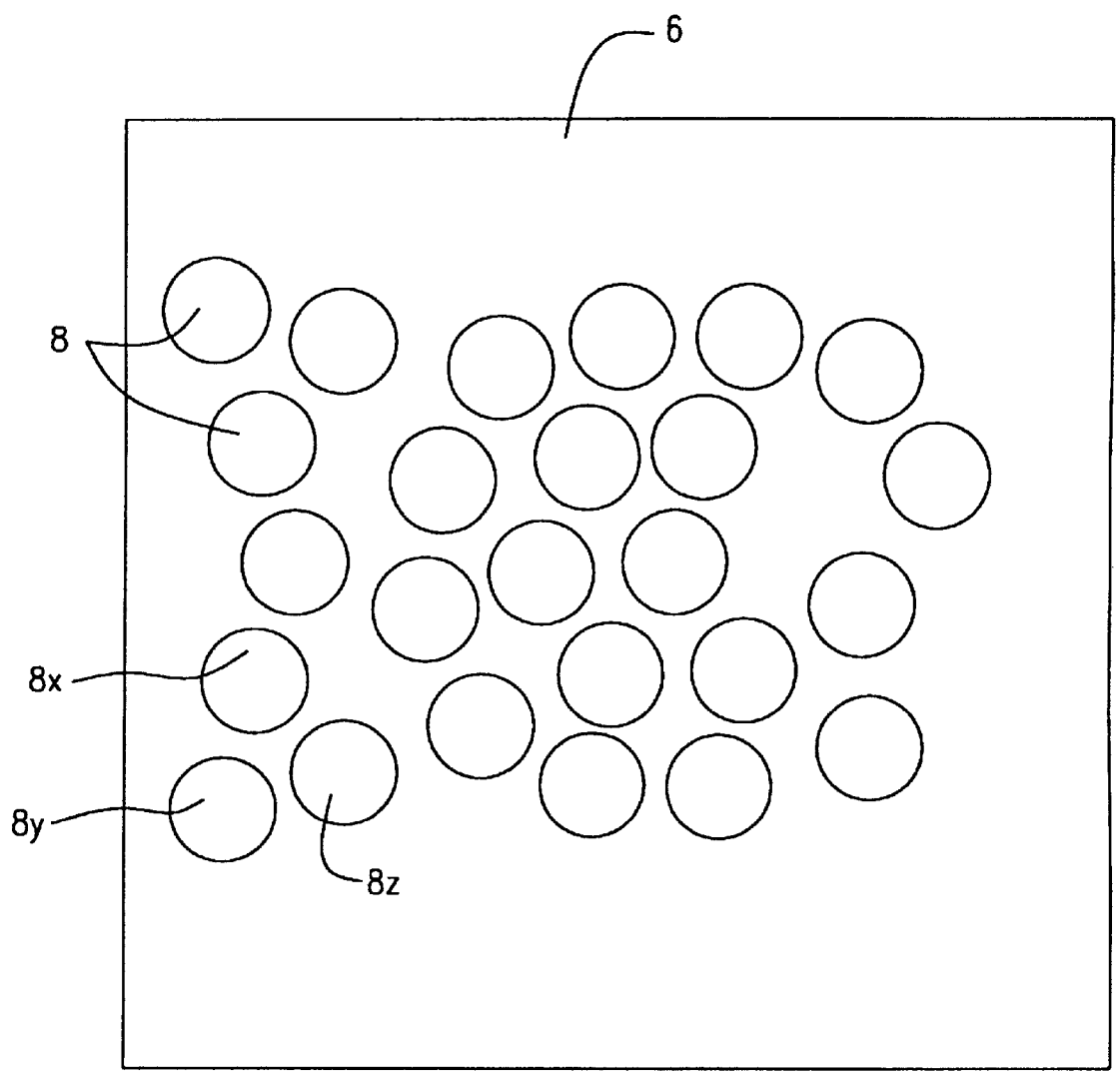
FIG. 2 depicts a top view of the second layer of a page of the book of the present invention.

As shown in FIG. 2, the second layer 6 is provided with a plurality of circular shapes die cut 8 therein. The circular shapes 8 may be configured into an illustration of any sort. In the embodiment of FIG. 2, they are configured into the shape of a fish (see FIG. 6).

The circular shapes 8 of the second layer 6 are positioned so that they align with the semicircular shapes 4 of the top layer 2. For example, semicircular shape 4x is position to align with circular shape 8x when the top layer 2 is adhered to second layer 6. Similarly, semicircular shapes 4y and 4z are positioned to align with circular shapes 8y and 8z, respectively, and so on.

The second layer 6 may constructed of any material which has sufficient strength so as to support a coin placed into the circular shapes die cut therein. Suitable for use with the present invention are plastics, cloth and cardboards. Preferred is a grey back cardboard. The circular shapes 8 are sized to snugly fit pennies, nickels, dimes, quarters, half dollars, foreign coins, or combinations thereof.

Figure 3:
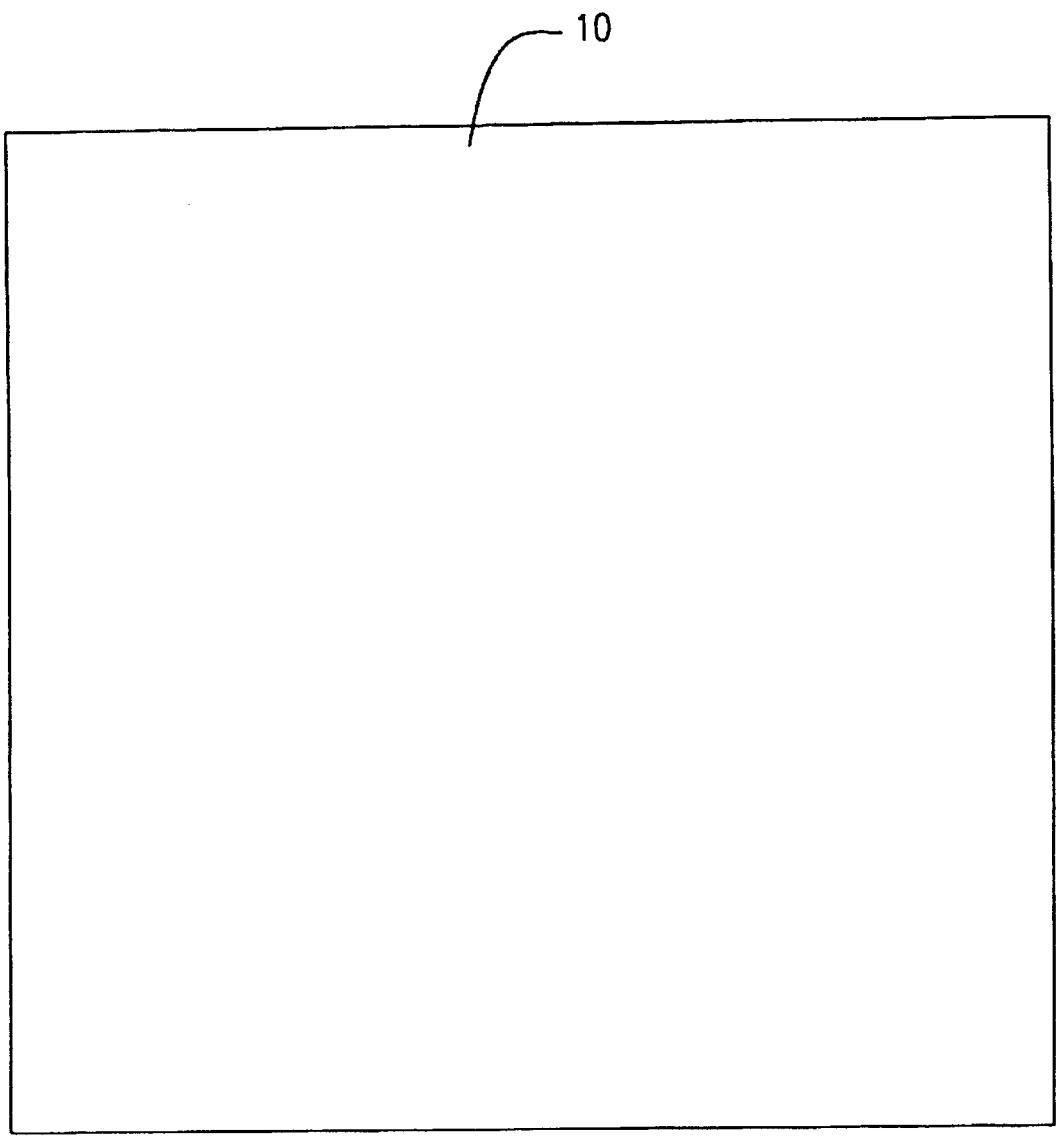
FIG. 3 depicts a top view of the middle layer of a page of the book of the present invention.

Referring to FIG. 3, there is shown the middle layer 10. The middle layer 10 has no shapes die cut therein, but may optionally have printing thereon. In preferred embodiments, each side of the middle layer 10 will be provided with printing which continues the picture which is shown on the top 2 and bottom 16 layers, respectively. The second layer 6 is fastened to the middle layer 10 by any means known to those of ordinary skill in the art, most typically by an adhesive. The middle layer may be constructed of any material sufficient to support weight of coins on both sides of the page and is of sufficient thickness such that the pressing of coins from one side of the middle layer 10 does not adversely affect the placement of coins in the appropriate slots on the other side of the middle layer 10. These materials may include plastic, cloth and cardboards. Especially preferred is a white board cardboard.

Figure 4:
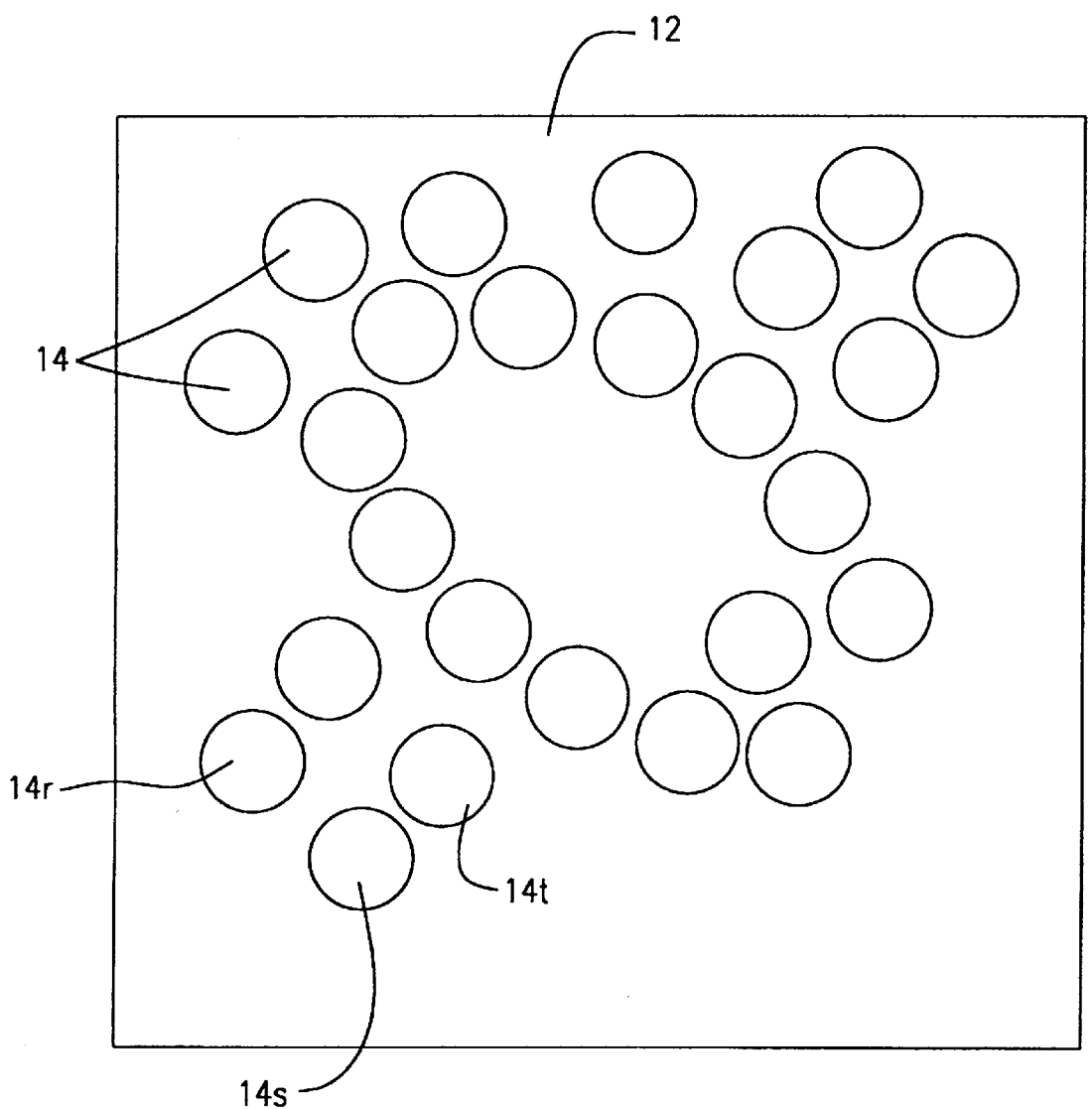
FIG. 4 depicts a top view of the fourth layer of a page of the book of the present invention.

As shown in FIG. 4, the fourth layer 12 is provided with a plurality of circular shapes die cut 14 therein. The circular shapes 14 may be configured into an illustration of any sort. In the embodiment of FIG. 4, they are configured into the shape of an airplane.

The fourth layer 12 is adhered to opposite side of the middle layer 10 as the second layer 6. The fourth layer 12 may constructed of any material which has sufficient strength so as to support a coin placed into the circular shapes die cut therein. Suitable for use with the present invention are plastics, cloth and cardboards. Preferred is a grey back cardboard. Typically, the second and fourth layers will be constructed of the same material. The circular shapes 14 are sized to snugly fit pennies, nickels, dimes, quarters, half dollars, foreign coins, or combinations thereof.

Figure 5:
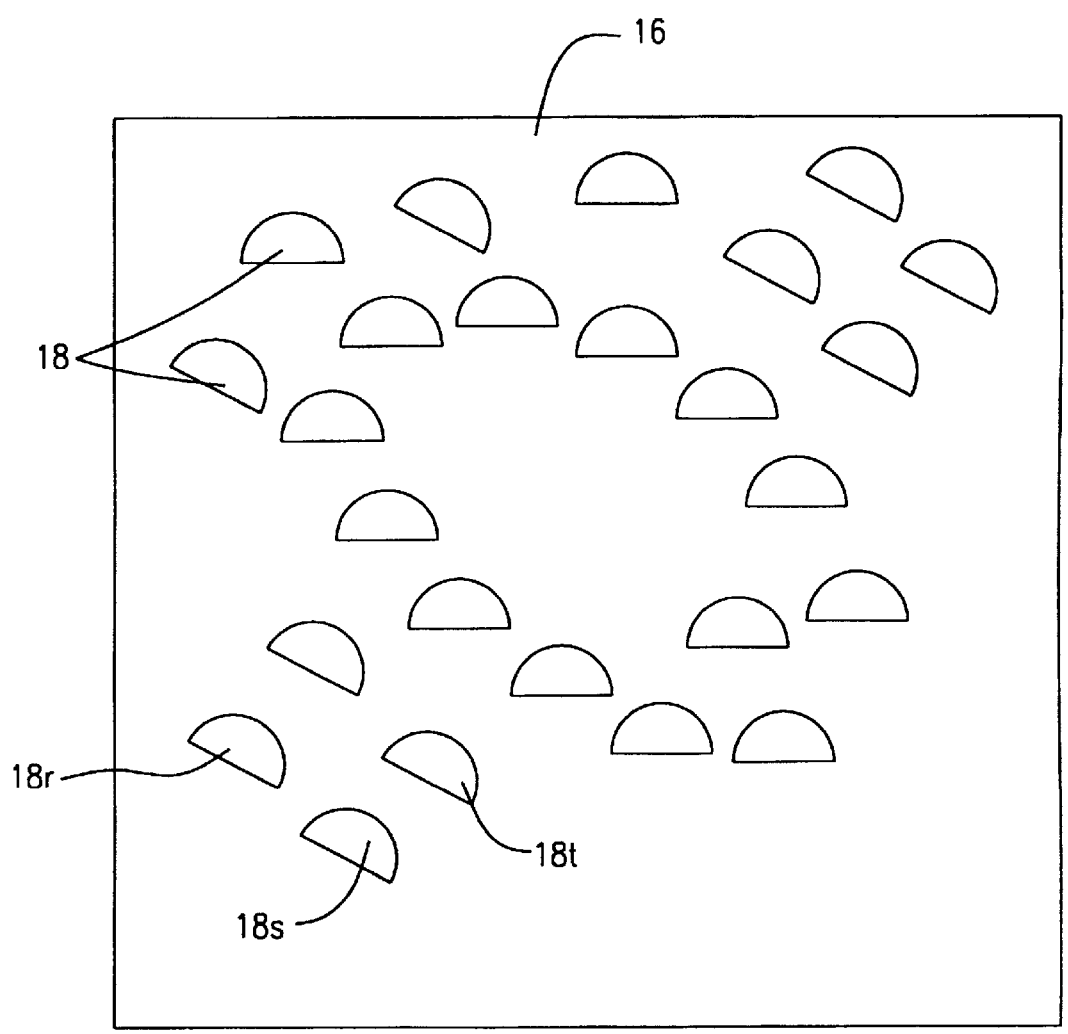
FIG. 5 depicts a top view of the bottom layer of a page of the book of the present invention.

As shown in FIG. 5, the bottom layer 16 is provided with a plurality of semicircular shapes die cut 18 therein. The semicircular shapes 18 may be configured into an illustration of any sort. In the embodiment of FIG. 5, they are configured into the shape of an airplane and are positioned so that they align with the circular shapes 14 of the fourth layer 12. For example, semicircular shape 18r of the bottom layer 16 is position to align with circular shape 14r when the bottom layer 16 is adhered to the fourth layer 12. Similarly, semicircular shapes 18y and 18z are positioned to align with circular shapes 14y and 14z, respectively, and so on.

The bottom layer 16 may constructed of any material which has sufficient strength so as not to rip upon the insertion of a coin into the semicircular shapes 18. Suitable for use with the present invention are plastics, cloth and paper having a density of at least about 25 g/m² more preferably about 28 g/m². Typically, the bottom layer 16 and the top layer 2 are constructed of the same material. The semicircular shapes 18 are sized to snugly fit pennies, nickels, dimes, quarters, half dollars, foreign coins, or combinations thereof.

The bottom layer 16 is fastened to the fourth layer 12 by any means known to those of ordinary skill in the art, most typically by an adhesive.

The slots formed by the semicircular die cuts and the circular die cuts of the top and second layers, and the fourth and bottom layers, can all be of the same size (i.e. to hold the same type of coin on the same page) or they may have differing sizes (i.e. to hold more than one type of coin on the same page). Thus, for example, one page could be only for holding quarters, or one page could be for holding quarters, dimes and nickels.

The pages of the book may be bound together by any suitable means as is known to those of ordinary skill in the art. Preferred is a book comprising from about 4 to about 20, more preferably about 24 pages, which is bound together by a wire binding. The spiral binding may be plastic or wire, such as a painted wire for aesthetic purposes.

The configuration of the slots may be formed into a wide variety of pictures, such as a fish (FIGS. 1, 2 and 6) or a plane (FIGS. 4 and 5), or a street paved with coins such a pennies (not shown), and which coordinate with the illustrations contained on the page. Alternatively, the illustrations could be of persons or fictional characters, or could comprise the illustrations of a story. The use of a story or fictional characters could greatly enhance the enthusiasm with which a child may approach the savings process. For example, the theme of the book could be country western, and one page could depict a country store where the illustrated candies are labeled with an appropriate amount of money with a space for saving, another page could depict a quarry where coins are dug out of the ground with space for saving the coins, and another page could be the lassoing of coins in different combinations which add up to a dollar, etc.

In this regard, the top and bottom layers are preferably constructed of a material which is amenable to printing thereon and is preferably of a high gloss.

Many variations of the present invention will suggest themselves to those skilled in the art in light of the above-detailed description. All such obvious modifications are within the full intended scope of the appended claims.

What is claimed is:

1. A book for the saving of coins comprising a front cover, a back cover and a plurality of pages bound on one side to said covers, wherein each said pages comprises:

(a) a top layer having a plurality of semicircular shapes die cut therein having a radius sized to fit a coin and comprised of a material having sufficient tear strength to support a coin without tearing;

(b) a second layer underneath said top layer having a plurality of circular shapes die cut therein positioned to coordinate with the semicircular shapes die cut in said top layer and comprised of a material more dense than the material employed in said top layer;

(c) a middle layer underneath said second layer and comprised of a material more dense than the material employed in said top layer;

(d) a fourth layer underneath said middle layer having a plurality of circular shapes die cut therein and comprised of a material more dense than the material employed in said top layer; and (e) a bottom layer having a plurality of semicircular shapes die cut therein having a radius sized to fit a coin and comprised of a material having sufficient tear strength to support a coin without tearing, and wherein said semicircular shapes are positioned to coordinate with the semicircular shapes die cut in said fourth layer.

2. A book for the saving of coins as defined in claim 1 wherein said binding comprises a plastic spiral binding or a spiral wire binding.

3. A book for the saving of coins as defined in claim 1 wherein said top and bottom layers comprise a paper stock having a density of at least about 125 g/m$^2$.

4. A book for the saving of coins as defined in claim 3 wherein said top and bottom layers comprise a paper stock having a density of 128 g/m$^2$.

5. A book for the saving of coins as defined in claim 1 wherein said second and fourth layers comprise a greyback cardboard.

6. A book for the saving of coins as defined in claim 1 wherein said middle layer comprises a white cardboard.

7. A book for the saving of coins as defined in claim 1 wherein said semicircular die cuts of the top layer and the circular die cuts of the second layer are coordinated to configure into an illustration of a person or object.

8. A book for the saving of coins as defined in claim 7 wherein said semicircular die cuts of the bottom layer and the circular die cuts of the fourth layer are coordinated to configure into a second illustration of a person or object.

9. A book for the saving of coins as defined in claim 1 wherein said semicircular and circular die cuts of the top and second layers, respectively, and of the bottom and fourth layers, respectively, are coordinated and sized to hold a penny, a nickel, a dime, a quarter, a half-dollar or combinations thereof.

* * * * *